Oct. 29, 1957            N. EDGE            2,811,475
TRANSFER PAPER AND DRY-STRIP TRANSFERS MADE WITH SUCH PAPER
Filed Oct. 26, 1953
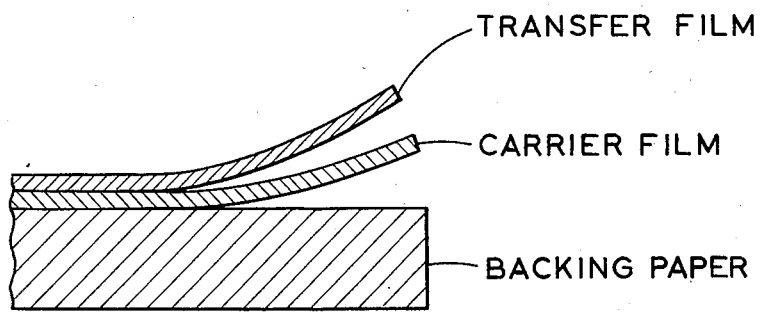
INVENTOR
Norman Edge.
BY
ATTORNEYS.

United States Patent Office 2,811,475
Patented Oct. 29, 1957

2,811,475

TRANSFER PAPER AND DRY-STRIP TRANSFERS MADE WITH SUCH PAPER

Norman Edge, Dimsdale, Wolstanton, Stoke-on-Trent, England, assignor to Brittains Limited, Cheddleton Paper Mills, near Leek, England, a British company Application October 26, 1953, Serial No. 388,422

Claims priority, application Great Britain November 20, 1952

5 Claims. (Cl. 154—46.8)

This invention relates to improvements in or relating to transfer paper and dry-strip transfers made with such paper.

Dry-strip transfer paper as available today consists of a thick paper backing permanently coated with polyethylene or a polyethylene composition. Transfers are printed upon the polyethylene-coated surface of the paper and may or may not be overprinted by a suitable adhesive which can be activated by solvents or by heat. The transfers are applied to any object by coating the surface of the object with a tacky adhesive or size, pressing the transfer into good contact with the object and then peeling away the transfer paper together with its polyethylene coating leaving the transfer firmly fixed to the object. If the transfer has been overprinted with a suitable adhesive, the "sizing" of the object is unnecessary. In this case, the adhesive is activated by moistening the transfer with a suitable solvent, the adhesive is allowed to become tacky and transferring is then effected in the manner described above. If the adhesive is thermoplastic the transfer is either applied to the hot surface of the object, or to the cold surface of the object and heat applied to the back of the transfer paper. The transfer paper with its polyethylene coating is then peeled away as described above.

The polyethylene coating bears a transfer film, i. e. a film formed by printing or coating with the lacquer-type or paint-type inks usually employed in the decalcomania trade or with water-soluble film formers and adhesives; the bond formed between the transfer film and the polyethylene film is weak, weaker than the cohesive strength of the transfer film, and will be referred to herein as a "mechanically rupturable bond." The latter is to be understood as meaning a bond between two contacting surfaces which can be ruptured without the use of liquids and without damaging either of the surfaces. It should be understood that when liquid is used as described above to moisten the adhesive on the transfer film, it plays no part in assisting the rupture of the bond between the polyethylene surface and the transfer film. The above-described transfers have acquired the name "dry-strip" because the polyethylene-coated paper is stripped from the transfer film without the use of liquids, in contradistinction to conventional transfers where the backing is stripped from the transfer film after wetting.

The dry-strip transfer paper at present available consists of a thick paper backing permanently coated on one surface with a thin coating of polyethylene to give a total thickness of 3–5 mils. Such a thickness is preferable in order to provide the necessary stiffness and strength for handling and printing. However, the thickness is a decided disadvantage from the transferring point of view as the application of localised pressures necessary during transfer is very difficult with thick papers, moulding the thick paper over curved surfaces is virtually impossible and its complete opacity makes accurate location of the transfer on the object difficult.

The present invention solves the above-described difficulty by using a dry-strip transfer, as illustrated in the single figure of the annexed diagrammatic drawing, having a mechanically rupturable bond between the backing paper and the polyethylene or other film, herein referred to as the "carrier film," to which the transfer film is to be applied. The carrier film must be strong enough to withstand handling and dry-stripping during the transferring operation and should be flexible and translucent or transparent. When transfers made with this paper are used, the paper backing is first removed by dry-stripping from the carrier film, the latter is then applied to the article to which the transfer is to be applied, and finally the carrier film is dry-stripped from the transfer film adhering to the article.

Thus the transfer of the invention comprises a backing paper, strong enough to withstand delamination in use, united by a mechanically rupturable bond to a carrier film of translucent flexible material, the carrier film in turn being united by a mechanically rupturable bond to a transfer film.

Preferably the material employed for the carrier film is insoluble in the solvents used in decalcomania work. The preferred material is polyethylene or a polyethylene composition, which may for example contain modifiers, such as waxes and/or polyisobutylene. The polyethylene may include an anti-oxidant.

Other materials having the desired properties may be used in place of polyethylene, such as, for example, polychlorotrifluoroethylene.

A convenient method of measuring the strength of the mechanically rupturable bond between the paper backing and the carrier film utilises the Marx-Elmendorf tearing tester. A sample of the coated paper is cut to dimensions 5 cms. wide x 10 cms. long. The film is then loosened along one of the 5 cm. wide edges and peeled back a distance of exactly 2 cms. The sample is then mounted in the instrument with the uncovered paper backing in one jaw and the free film in the other. The sector on the instrument is then allowed to swing, the film is peeled away from the backing paper and the pointer gives a reading of the work done in the separation. The preferred strength of the mechanically rupturable bond as measured on this instrument is such as to give pointer readings of between 10 and 50.

Whilst the strength of the mechanically rupturable bond should be low to enable the carrier film to be readily peeled away from its backing paper, it should be high enough to enable the composite structure to withstand the pull of the viscous inks used in high speed printing presses without premature separation of the carrier film and paper backing taking place.

Preferably a thick backing paper of about 4 mils thickness is coated by an extrusion-lamination process with polyethylene to form a film of polyethylene of about 1 mil in thickness. Due to the anti-adhesive characteristics of polyethylene and the polar nature of the cellulose material of the paper backing, the specific adhesion of the polyethylene for paper is very low and the adhesion of the coating is governed almost entirely by the degree of mechanical adhesion obtained by the coating process and the type of backing paper used. According to the nature of the paper backing surface and its smoothness, the pressure used in the nip formed by the backing roll and the water-cooled metal roll and the degree of penetration allowed during extrusion coating prior to chilling, the degree of mechanical adhesion obtained can be varied appreciably. For example, if a smooth impervious paper, such as glassine paper, is employed as the backing, the mechanical adhesion obtained will be small and the polyethylene film formed on such a surface can be peeled away from it very easily indeed.

If the paper surface were rough and porous and the conditions as regards temperature and time interval prior to chilling during the coating favoured a strong bond, the mechanical adhesion obtained would be stronger than the cohesive strength of the paper and the latter would delaminate rather than release the polyethylene film which is well keyed into the paper.

Briefly, as is well-known to those engaged in the art, extrusion-lamination coating consists of feeding hot, thermoplastic material (e. g. polyethylene) from a plastics extruder into a flat film die. The thick film of molten material is extruded directly into a nip formed by a resilient backing roll, which carries the backing paper into the nip, and an internally water-cooled metal roller. The continuous web of backing paper to be coated is fed from a let-off reel over heaters and via tensioning rolls to the backing roller. The paper is carried partly around the backing roller and through the nip of the backing roller and water-cooled metal roller. The continuous sheet of molten thermoplastic material, such as polyethylene, issuing from the die, which is immediately above the nip and parallel to it, is carried into the nip and is bonded to the exposed surface of the paper under the influence of the pressure between the backing and water-cooled rollers. This latter chills and sets the coating and the coated paper is carried out of the nip and partly around the water-cooled metal roller for further cooling of the coating. It is then led off to the slitter and reel-up mechanism. By increasing the speed of travel of the backing paper through the nip relative to the rate at which the thick film of molten plastic issues from the die, hot stretching takes place and the thickness of the film coating is reduced to that desired. It is most important that the pressure between the resilient backing roller and the water-cooled metal roller should be uniform and capable of accurate control and that the temperature of the chilled metal roller be accurately controlled. For a given paper backing of fixed moisture content, it will be understood by those engaged in the art, that the chief adjustment to obtain the desired degree of adhesion between the coating or carrier film and the paper backing is the pressure in the nip. A low pressure results in weak adhesion whilst a high pressure favours strong adhesion. The moisture content of the paper backing as it enters in the nip also determines to some extent the degree of adhesion obtained. A relatively high moisture content renders good adhesion difficult whilst a low moisture content favours it, other factors being constant. It is, therefore, possible to obtain auxiliary control of the adhesion by controlling the moisture content of the paper by heaters prior to its entry in the nip.

A suitable backing paper is that used as the backing paper in the transfer paper which is sold under the trade name "Duplex," and a suitable grade of polyethylene for the carrier film is "Alkathene 7F" supplied by Imperial Chemical Industries Limited and the preferred thickness is about 1 mil. At this thickness, it is strong, flexible and elastic. It is possible to incorporate such modifiers as waxes or polyisobutylene but in general these are not necessary or desirable. It should be as smooth as possible to eliminate the possibility of mechanical adhesion of the transfer to the polyethylene coating.

The composite structure is printed to form the transfer film on the polyethylene coated side by any of the usual printing processes using the various lacquer-type, paint-type or water-soluble film-forming materials normally employed as inks in the decalcomania trade. To apply the transfer so produced, the carrier film carrying the transfer film is peeled away from its paper backing and applied to an object coated with a tacky adhesive or "size," so that the transfer contacts the latter. Correction location or registry of the transfer is facilitated by the transparent nature of the film of polyethylene. Furthermore, good contact between the transfer and object by rubbing and localised pressing and its moulding to curved surfaces is readily accomplished by virtue of the thinness of the film, its flexibility and its rubbery elasticity. The carrier film can then be peeled away easily from the object, leaving the transfer film firmly affixed in position. This is because the bond between the polyethylene carrier film and the transfer film is so much weaker than the bond between the transfer film and the object.

If preferred, the transfer can be overprinted with a suitable adhesive which can be activated by moistening with solvents or by heat. The sizing of the object prior to transferring is then rendered unnecessary.

In the following examples, which illustrate the production and use of the transfers of the invention, the dry-strip transfer paper employed was made by coating a backing of a thickness of about 4 mils, which is normally used in the transfer paper which is sold under the trade name "Duplex," with a polyethylene film of about 1 mil. thickness by extrusion-lamination. The strength of the mechanically rupturable bond between paper and polyethylene was within the preferred range of 10 to 50 when measured by the method described in detail above. It is obvious from what has been said before, that the mechanically rupturable bond between the carrier film and the transfer film will be greater than the mechanically rupturable bond between the backing paper and the carrier film.

*Example 1*

A lacquer consisting of low-viscosity cellulose acetate, plasticised with 50% by weight of diethyl phthalate on the weight of cellulose acetate, was dissolved in a mixture of acetone and methyl glycol and brushed evenly on the polyethylene-coated surface of the transfer paper. After drying, the polyethylene carrier film, together with the transfer film of plasticised cellulose acetate, could be readily dry-stripped from the paper backing and the cellulose acetate transfer film could be readily parted from the carrier film of polyethylene.

*Example 2*

A transfer consisting of a linseed oil litho varnish and pigment was printed lithographically on the polyethylene-coated surface of the transfer paper. The carrier film of polyethylene bearing the print was stripped from its paper backing and applied, print side down, to a surface which had been rendered tacky by a coating of litho size. The polyethylene carrier film was then peeled away without difficulty, leaving the printed design firmly fixed on the object.

*Example 3*

Polyvinyl alcohol dissolved in a mixture of water and ethyl alcohol was brushed evenly on the polyethylene-coated surface of the transfer paper and, after drying, the carrier film of polyethylene bearing the polyvinyl alcohol transfer film could be readily stripped from the paper backing. The polyethylene carrier film was then applied to a moistened glass plate with the polyvinyl alcohol transfer film contacting the latter. After a short wait, to allow development of adhesion between the polyvinyl alcohol and glass, the polyethylene carrier film was easily dry-stripped from the former.

*Example 4*

A nitrocellulose lacquer plasticised with 57% by weight of trixylenyl phosphate on the weight of nitrocellulose was evenly applied by brush to the polyethylene-coated surface of the transfer paper. This was then overcoated, after drying, with a solution of polyvinyl alcohol dissolved in a mixture of water and ethyl alcohol. After drying, the carrier film of polyethylene, bearing the transfer film of plasticised nitrocellulose together with the overcoated adhesive of polyvinyl alcohol, was stripped from the paper backing and applied to a moistened glass plate so that the adhesive coating of polyvinyl alcohol was in contact with the latter. After a small interval of time, when adhesion had developed between the polyvinyl alcohol and glass, the polyethylene carrier film was readily peeled away, leaving the transfer film of nitrocellulose firmly fixed to the glass plate.

What I claim is:

1. A transfer for application to an object comprising a backing paper of approximately 4 mils thickness, a thin carrier film of transparent polyethylene of approximately 1 mil in thickness adhesively bonded to said backing paper by a mechanically rupturable bond of a strength 10 to 50 as measured by a Marx-Elmendorf tearing tester, and a transfer film adhesively bonded to said carrier film by a mechanically rupturable bond of a strength greater than that of said first mentioned rupturable bond, said transfer film having a co-hesive strength when applied to the object greater than said second mentioned mechanically rupturable bond, whereby said first mentioned mechanically rupturable bond will be ruptured prior to the rupturing of said second mentioned mechanically rupturable bond and said transfer film will be securely held by said object when applied thereto.

2. A transfer for application to an object as in claim 1 and wherein said transfer film comprises a cellulose acetate lacquer having 50 percent by weight of diethyl phthalate plasticiser, said lacquer being soluble in an acetone and methyl glycol mixture.

3. A transfer for application to an object as in claim 1 and wherein said transfer film comprises a linseed oil litho varnish and a pigment.

4. A transfer for application to an object as in claim 1 and wherein said transfer film comprises a polyvinyl alcohol soluble in a mixture of water and ethyl alcohol.

5. A transfer for application to an object as in claim 1 and wherein said transfer film comprises a nitrocellulose lacquer having 57 percent by weight trixylenyl phosphate plasticiser, said lacquer having an overcoating of polyvinyl alcohol soluble in a mixture of water and ethyl alcohol.

References Cited in the file of this patent

UNITED STATES PATENTS

| | | |
|---|---|---|
| 1,678,341 | Kaber | July 24, 1928 |
| 1,714,503 | Gorham | May 28, 1929 |
| 1,958,792 | Kubin | May 15, 1934 |
| 2,394,701 | Laws | Feb. 12, 1946 |
| 2,558,804 | Wittgren | July 3, 1951 |
| 2,598,090 | Yung et al. | May 27, 1952 |
| 2,639,253 | Reese | May 19, 1953 |
| 2,746,877 | Matthes | May 22, 1956 |
| 2,746,893 | Matthes | May 22, 1956 |